Patented Aug. 13, 1946

2,405,737

UNITED STATES PATENT OFFICE 2,405,737

CERTAIN SULPHOSUCCINATES AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application May 25, 1942, Serial No. 444,466. Divided and this application July 1, 1943, Serial No. 493,167

9 Claims. (Cl. 260—401)

This invention relates to a new chemical product or compound, our present application being a division of our pending application Serial No. 444,466, filed May 25, 1942, which subsequently matured as U. S. Patent No. 2,353,694, dated July 18, 1944.

The main object of our invention is to provide a new chemical compound or composition of matter, that is an efficient demulsifier for crude oil emulsions of the water-in-oil type, but which is adapted for use for other purposes, or in other arts, as hereinafter indicated.

Another object of our invention is to provide a practicable method for making the said new compound or chemical product.

Although one of the primary objects of our invention is to provide a new compound or composition of matter that is an efficient demulsifier for crude oil emulsions of the water-in-oil type, the said compound or composition of matter is adapted for use in other arts, as hereinafter indicated.

The compounds herein described are esters of sulphosuccinic acid, or the obvious chemical equivalent thereof, for example, sulphomethylsuccinic acid, in which at least one of the alcoholic compounds supplying an ester radical is an oxyalkylated acidyl-aryl-sulphonimid.

Reference is made to U. S. Patent No. 2,072,085, dated March 2, 1937, to De Groote and Keiser. Said patent discloses, among other demulsifiers, the type of compound which may be exemplified by the formula:

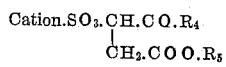

in which $R_4$ and $R_5$ represent organic radicals derived by dehydroxylation of an alcoholiform hydroxyl-containing organic compound, with the proviso that the molecular weight range must be within the limits of 270 and 2700. The compounds are not limited to sulphosuccinates, but it is pointed out therein that a number of obvious chemical equivalents may serve with equal effectiveness. It is particularly to be noted that in this instance all reference to succinic acid or sulphosuccinates is intended to include as the absolute chemical equivalent in each and every instance methylsulphosuccinic acid and methylsulphosuccinates, i. e., compounds derived from citraconic acid or citraconic anhydride, instead of being derived from maleic acid or maleic anhydride, as described in said aforementioned De Groote and Keiser Patent No. 2,072,085. This applies particularly to the hereto appended claims.

In view of what has been said, it appears pertinent at this point to describe the oxyalkylated acidyl-aryl-sulphonimids which furnish the radical indicated either by $R_4$ or $R_5$. The oxyalkylation products, i. e., alcoholic bodies employed for dehydroxylation, are derived by oxyalkylation of compounds sometimes referred to as "acidyl-aryl-sulphonimids." (See U. S. Patent No. 1,145,499, dated July 15, 1914, to Bückel.) Such sulphonimids represent the product obtained by the introduction of two acyl radicals into the ammonium radical, one acyl radical being derived from a high molal detergent-forming monocarboxy acid, and the other acyl radical being derived from an aryl sulphonic acid. Since the word "acyl" can properly be employed to described both such acidic radicals, it is convenient to use the word "acidyl" in a limited sense to refer to the acyl radical derived from a carboxy acid.

The expression "detergent-forming monocarboxy acids" has been frequently employed in the literature to designate certain high molal acids having at least 8 and not more than 32 carbon atoms, and characterized by the fact that they combine with alkali to form soap or soap-like materials. The commonest examples are higher fatty acids derived from animal, vegetable, or marine sources. Other well known examples include resinic acids, such as abietic acid, naturally-occurring petroleum acids, such as those obtained by the oxidation of petroleum hydrocarbons, waxes and the like, and from certain naturally-occurring waxes. Such monocarboxy detergent-forming acids may be cyclic or acyclic. They may be saturated or unsaturated. Included also are derivatives which do not eliminate the soap-forming property, and which are obviously chemical equivalents of the unmodified acid. For instance, chlorinated oleic acid will serve as satisfactorily as oleic acid. Hydrogenated abietic acid is as satisfactory as the material prior to hydrogenation. Brominated naphthenic acid is as satisfactory as the naphthenic acid itself. This also applies to similar derivatives obtainable from oxidized petroleum acids, wax acids, etc.

The aryl group may be monocyclic or polycyclic. In the polycyclic type the rings may be separated or fused. One or more alkyl radicals may be substituted in aromatic nucleus, for instance, derivatives may be obtained from toluene, xylene, cymene, methylnaphthalene, di-isopropylnaphthalene, amylated naphthalene, and similar aromatics, in which the alkyl side chain may contain as many as 20 carbon atoms. Other non-functional substituents may also be present. The usual procedure is to react the selected aromatic compound with chlorosulphonic acid, or use any other suitable reactant to obtain the sulphonchloride. The sulphonchloride is then reacted with ammonia to yield the sulphonamid. As to a more complete list of suitable aromatic compounds, see U. S. Patent No. 2,248,342, dated July 8, 1941, to De Groote and Wirtel. This patent includes, among others, aromatic compounds obtained by introducing the octadecyl radical into the aromatic nucleus. Such radical can be introduced into benzene, naphthalene, diphenyl or into a substituted benzene, a substituted naphthalene, or a substituted diphenyl.

Another procedure for obtaining aromatic sulphonchlorides depends upon reaction with the corresponding sulphonic acid, certain non-metallic halides, such as sulphur-chlorides, or phosphorous chlorides being employed. One can prepare numerous substituted aromatic sulphonic acids in the manner described in U. S. Patent No. 2,278,167, dated March 31, 1942, to De Groote and Keiser. It is, of course, understood that unsubstituted aromatic sulphonic acids may be employed, and in fact, in some instances, are available as inexpensive by-products. The manufacture of the acyl chlorides presents no particular difficulty, especially when manufactured from high molal saturated monocarboxy acids. Reference is made to the manufacture from saturated fatty acids, from naphthenic acids, wax acids obtained from naturally-occurring waxes, oxidized petroleum acids, etc. Some of the procedures employed for preparing the high molal acyl chlorides are not as satisfactory when unsaturated acids such as oleic acids are employed. Thus, sulphurchloride may serve satisfactorily for preparing the acyl chloride from stearic acid, but it is not as satisfactory, if oleic acid is used. Phosphorous chlorides, for instance, phosphorous pentachloride, may be used equally satisfactorily, as a rule, with either saturated acids, or monoethylenic acids. The same is true of thionyl chloride. As to such procedures, see aforementioned Bückel patent. When the high molal acids are of the polyethylenic type, or contain some other functional group, in addition to a single ethylene linkage, other difficulties may be encountered and special methods may be required.

When a sulphonamid, particularly a monocyclic sulphonamid free from nuclear substituted alkyl radicals, or having, at the most, short chain alkyl radicals present, is treated with suitable acidyl chloride, one obtains practically a quantitative yield, of the acidyl-aryl-sulphonimid. This procedure is so simple that it may be readily illustrated by the procedure described in the aforementioned Bückel patent. The short alkyl chain or chains preferably have less than 6 carbon atoms.

ACIDYL-ARYL-SULPHONIMID

Example 1

98 kilos of sodium benzenesulphonamid are heated in an oil bath for about 1–2 hours at about 100–120° C., with 152 kilos of stearic acid chloride. When recrystallized from alcohol, the crude product melts at 104° C.

The reaction may be indicated in the following manner:

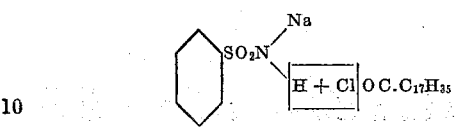

ACIDYL-ARYL-SULPHONIMID

Example 2

85 kilos of para-toluenesulphonamid are heated on the water bath in presence of an indifferent solvent such, for instance, as carbon tetrachloride, with 137 kilos palmitic acid chloride, until the evolution of hydrochloric acid ceases. When crystallized from alcohol the product thus obtained melts at 100–102° C.

The reaction may be indicated in the following manner:

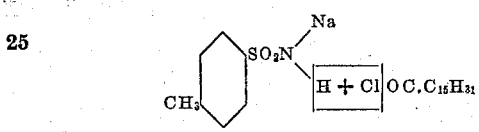

Thus, in view of what has been said, it is obvious that one can readily obtain acidyl-aryl-sulphonamids of the formula:

in which $R_1$, $R_2$ and $R_3$ represent hydrogen atoms or alkyl radicals containing one to twenty carbon atoms. R is an aromatic nucleus of the monocyclic or polycyclic type, and R' is an acidyl radical obtained from a high molal detergent-forming monocarboxy acid having at least 8 carbon atoms and not more than 32 carbon atoms.

We have found that if an acidyl-aryl-sulphonimid of the kind above described is treated with an oxyalkylating agent in the customary manner employed to oxyalkylate a phenol, a high molal acid, or the like, one obtains a variety of valuable intermediates which may be water-insoluble, or water-miscible, or water-soluble, depending upon the nature of the oxyalkylating agent used, and the molar proportion of oxyalkylating agent to sulphonimid. The presence of the two acyl radicals, one of which is a sulphonyl radical, in the sulphonimid molecule, makes the compound acidic. Such compounds combine with alkalies to give salts. Compare with the well known Hinsberg reaction. Thus, essentially the same procedure may be employed in oxyalkylation as is used in the treatment of high molal sulphonic acids. For instance, see U. S. Patent No. 2,208,581, dated July 23, 1940, to Hoeffelmann. Briefly stated, the procedure employed is to treat the anhydrous sulphonamid with a suitable alkylating agent containing a reactive ethylene oxide ring. As typical examples of applicable compounds may be mentioned glycerine epichlorhydrin, glycide alcohol, ethylene oxide, propylene oxide, butene-2-oxide, butene-1-oxide, isobutylene oxide, butadiene oxide, butadiene dioxide, chloroprene oxide, isoprene oxide, decene oxide, styrene oxide, cyclohexylene oxide, cyclopentene oxide, etc. The reactive olefine oxides which we prefer to employ are propylene oxide, butylene oxide, glycidol, and methyl glycidol, and especially ethylene oxide.

As intermediates for subsequent conversion into sulphosuccinates, we particularly prefer the type of oxyalkylation products, in which a comparatively small amount of olefine oxide is used per mole of acidyl-aryl-sulphonimid. Indeed, reaction in molecular proportions, i. e., one mole of the olefine oxide, per mole of imid supplies a suitable intermediate for subsequent conversion into a sulphosuccinate, insofar that minimum oxyalkylation is sufficient to introduce an alcoholic radical. Our preference, then, is to convert such water-insoluble oxyalkylation products into sulphosuccinates, and it is to be emphasized again that this includes methylsulphosuccinates, i. e., derivatives of citraconic acid or anhydride. However, one may convert the water-miscible oxyalkylation products, and for that matter, one may convert the oxyalkylation products which are already water-soluble. Peculiarly enough, in the latter case such products sometimes exhibit increased effectiveness as demulsifiers and also as emulsifiers.

In a general way, the larger the proportion of oxyalkylating agent per mole of sulphonimid, the greater the hydrotropic and hydrophile proportions. Thus, 5 to 10 moles of ethylene oxide per mole of sulphonimid greatly enhances such properties. If 20–60 moles of the oxyalkylating agent, particularly ethylene oxide, is employed, one obtains an intermediate of pronounced water-solubility, provided that the molal weight of the initial sulphonimid, is not too large. Generally speaking, a minimum of two moles of ethylene oxide must be introduced for each carbon atom in the sulphonimid to insure complete water-solubility in the intermediate product, prior to sulphation.

Considering momentarily intermediate products derived from ethylene oxide, they may be depicted in the following manner:

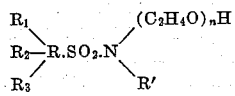

in which all the characters have their previous significance and $n$ may represent any number from 1 to 60.

In view of what has been said, it hardly appears necessary to include examples of the intermediate product beyond stating that oxyalkylation can generally be conducted under mild conditions of reaction. For instance, a temperature of 100–125° C. is usually satisfactory; secondly, pressure of less than 200 gauge pressure is usually satisfactory, the reaction may take place in a comparatively short period, for instance, two hours or less, but in other instances, as long as twenty hours may be employed. The reaction is conducted by using a suitable apparatus that insures intimate contact between the oxyalkylating agent and the sulphonimid. After the introduction of the first molecule of ethylene oxide or oxyalkylating agent, acidity has disappeared, and the subsequent stages are sometimes suitably catalyzed by the presence of a small amount of alkali, such as caustic soda, sodium methylate, soap, or the like, which may be present to the extent of one tenth of 1% to one-half of 1%. Compare with the oxyalkylation of high molal alcohols.

OXYALKYLATED ACIDYL-ARYL-SULPHONIMID

*Example 1*

Stearoyl benzene sulphonimid sodium salt is dissolved in any suitable solvent, such as benzene or alcohol, and treated with dry hydrochloric acid gas so as to liberate the imid with the precipitation of salt. The salt is filtered off and the solvent evaporated. One pound mole of the imid so obtained is treated with one pound mole of ethylene oxide so as to produce the corresponding substituted nitrogen-linked hydroxyethyl stearoyl benzene sulphonimid.

The reaction may be indicated in the following manner:

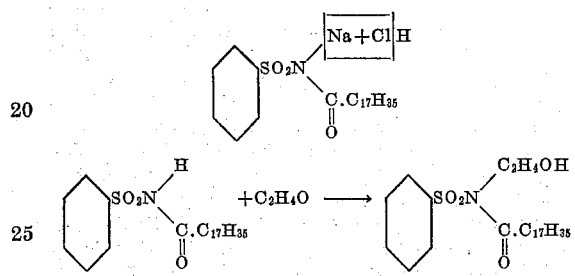

OXYALKYLATED ACIDYL-ARYL-SULPHONIMID

*Example 2*

The substituted imid obtained in the manner described in the preceding example is mixed with two tenths of 1% of sodium methylate and then subjected to further oxyethylation with 5 pound moles of ethylene oxide for each pound mole of the substituted imid.

OXYALKYLATED ACIDYL-ARYL-SULPHONIMID

*Example 3*

The same procedure is followed as in the preceding example, except that 10–20 pound moles of ethylene oxide are used for each pound mole of the substituted imid.

OXYALKYLATED ACIDYL-ARYL-SULPHONIMID

*Example 4*

Palmitoyl paratoluene sulphonimid obtained in the manner previously described, is substituted for stearoyl benzene sulphonimid in Examples 1–3, preceding.

OXYALKYLATED ACIDYL-ARYL-SULPHONIMID

*Example 5*

The same procedure is followed as in Examples 1–3, preceding, except that the sulphonimid is derived from mixed high molal fatty acid chlorides of the kind available in the open market, and the sulphonimid is derived from cymene.

As has been suggested, one need not employ the sulphonimid derived from a single fatty acid, but one may employ the imid derived from a mixture of fatty acids, and especially, from the mixture obtained by the hydrogenation of naturally-occurring fats or oils. For instance, unsaturated naturally-occurring oils, such as olive oil, teaseed oil, soyabean oil, cottonseed oil, etc., may be hydrogenated and then subjected to saponification or hydrolysis. The mixture of fatty acids so obtained or the mixture obtained from palm oil, or palm kernel oil, may be converted into a corresponding acyl chloride and employed in the present instance. Attention is again directed to the fact that it is our preference to use an oxyalkylating agent having not over 4 carbon atoms, i. e., ethylene oxide, propylene oxide, butylene oxide, glycidol, and methyl glycidol.

Reference is again made to U. S. Patent No. 2,072,085, for a complete description as to the conventional method or means for manufacturing sulphosuccinates and methylsulphosuccinates of the kind described. In the previous formula reference has been made to a cation. Usually, such cation is the sodium atom, for the reason that sulphosuccinates are most readily prepared by first preparing the ester of maleic acid, or methyl maleic acid and treating such ester with a bisulphite. Since sodium bisulphite is more readily obtainable than potassium bisulphite, or some other sulphite, it is generally employed. As is well known, it is possible to use sulphur-dioxide gas in the presence of the base, instead of bisulphite. The base may be an amine, such as triethanolamine, amylamine, benzylamine, cyclohexylamine, etc. If one desires to produce the type of compound, and this is a preferred type, in which the radicals $R_4$ and $R_5$ are both derived by dehydroxylation of an oxyalkylated acidylaryl-sulphonimid, then one need only follow the precedure specifically outlined in said aforementioned De Groote and Keiser Patent No. 2,072,085. Such procedure is illustrated by the following examples:

Di(Oxyalkylated Acidyl-Aryl-Sulphonimid)-Maleate

Example 1

Two pound moles of an oxyalkylated acidyl-aryl-sulphonimid of the kind exemplified by Example 1, preceding, is converted into the dimaleate in the manner described in the aforementioned U. S. Patent No. 2,072,085.

The reaction may be indicated in the following manner:

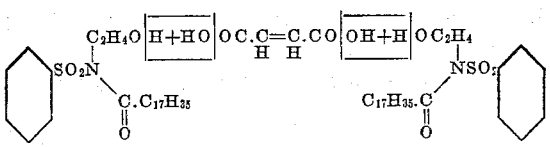

Di(Oxyalkylated Acidyl-Aryl-Sulphonimid)-Maleate

Example 2

The same procedure is followed as in Example 1, preceding, except that the oxyalkylated acidyl-aryl-sulphonimid employed is of the kind exemplified by Examples 2-6, preceding, instead of Example 1, preceding.

Di(Oxyalkylated Acidyl-Aryl-Sulphonimid)-Maleate

Example 3

The same procedure is followed as in Examples 1 and 2, preceding, except that citraconic anhydride, i. e., methyl maleic anhydride, is substituted for maleic anhydride.

Sulphosuccinate Compound

Example 1

One pound mole of a maleated ester described under the three previous headings is treated with one pound mole of sodium bisulphite in the manner described in the aforementioned U. S. Patent No. 2,072,085.

The reaction may be indicated in the following manner:

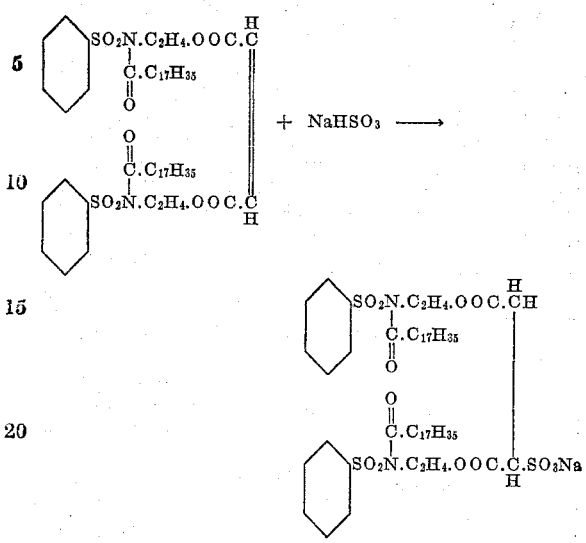

Sulphosuccinate Compound

Example 2

The same procedure is followed as in Example 1, preceding, except that potassium bisulphite is substituted for sodium bisulphite.

If, however, one desires to prepare the type of material in which the radicals previously referred to as $R_4$ and $R_5$ are not identical, then, one need only prepare the acid maleate or acid citraconate, that is, a fractional ester from any one of a number of alcoholic compounds described in the aforementioned U. S. Patent No. 2,072,085. Reference is made particularly to the alcoholic compounds found on page 2 of said patent, right hand side, lines 43 to 72, inclusive, where the following are enumerated: Monohydric alcohols, such as propyl alcohol, butyl alcohol, amyl alcohol, hexyl alcohol, octyl alcohol, decyl alcohol, dodecyl alcohol, stearyl alcohol; unsaturated monobasic alcohols, such as oleyl alcohol; polyhydric alcohols, such as glycols, ethylene glycol, for example, glycerol, polyglycerols, etc.; ether alcohols, such as diethylene glycol butyl ether, etc.; polyhydric alcohols having at least one remaining free hydroxyl, in which one or more hydroxyls has been previously reacted with a suitable acid, such as monoricinolein, diricinolein, monostearin, monoolein, or the equivalent bodies derived from polyglycerols; acid alcohols, such as hydroxystearic acid, ricinoleic acid, polyricinoleic acid, triricinolein, etc.; polyhydric alcohols, in which one or more dibasic carboxy acid residues have been introduced, such as a phthalic acid residue, a maleic acid residue, an oxalic acid residue, etc. (Such polyhydric alcohol bodies may be employed, providing a free hydroxyl remains); cycloalcohols such as phenol, cresol, xylenol, naphthol, etc.; aralkyl alcohols, such as benzyl alcohol; heterocyclic alcohols, such as furfuryl alcohol, etc.; mixed isomer forms of the various alcohols, such as mixed amyl alcohols, etc. By way of illustration, the following examples are included:

Mixed Maleates

Example 1

One pound mole of octyl acid maleate is reacted with one pound mole of an oxyalkylated acidyl-aryl-sulphonimid of the kind exemplified by Example 1, preceding, so as to eliminate one mole of water and obtain the dimaleate. The procedure employed is that described in the aforementioned U. S. Patent No. 2,072,085.

The above reaction may be indicated in the following manner:

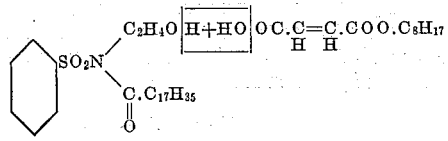

Mixed Maleates

Example 2

The same procedure is followed as in the preceding example, except that one employs an oxyalkylated acidyl-aryl-sulphonimid of the kind exemplified by Examples 2–5, preceding, instead of Example 1, preceding.

Mixed Maleates

Example 3

The same procedure is followed as in the two examples immediately preceding, except that the compound is prepared from citraconic anhydride, instead of maleic anhydride.

Sulphosuccinate Compound

Example 3

The same procedure is followed as in sulphosuccinates, Examples 1 and 2, preceding, i. e., the mixed dimaleates are reacted in molar proportion with sodium bisulphite, or potassium bisulphite in the manner described in the aforementioned U. S. Patent No. 2,072,085.

The reaction may be indicated in the following manner:

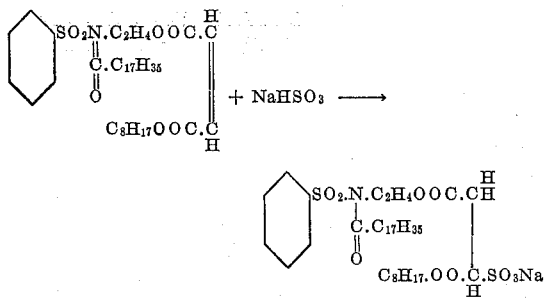

Once more reference is made to U. S. Patent No. 2,072,085 in regard to the reference that the molecular weight range be within certain designated limits.

In reviewing what has been said, it is necessary that there be a differentiation in regard to the molecular weight of the compounds herein contemplated, as compared with those contemplated in the aforementioned U. S. Patent No. 2,072,085. The minimum molecular weight in the present instance is 536. As, for example, in the preceding formula, where the cation is the $NH_4$ radical, and $R_4$ is a methyl radical, and $R_5$ is obtained from one mole of benzene-sulphonimid reacting with one mole of the acylchloride derived from ethyl hexenoic acid and one mole of ethylene oxide as the alkylating agent. Since the alcoholic residue containing the sulphonimid radical may be derived from polycyclic compounds, and since more than one side chain may be introduced, having for example, 18 carbon atoms, and since the group that introduces the oxyalkyl radical may repeat itself, a large number of times, and since the acidyl group may be derived from montanic acid, it is obvious that reviewing the limits stated, one could readily obtain a compound having a molecular weight range as high as 3,000, or even higher. Consider, for example, an instance where the oxybutylene group is introduced a large number of times, for instance, 40 or more times. With this in mind, it will be noted that the molecular weight range of compounds of the kind herein contemplated as such and as demulsifiers, is concerned with the range of 536 to approximately 5,000.

The new product or compound herein described is not only an efficient demulsifier for petroleum emulsions of the water-in-oil type, but it is also adapted for use in the flooding of subterranean oil-bearing sands; in the prevention of oil-in-water emulsions in the acidization of calcareous oil-bearing strata; as a break inducer in the doctor treatment of sour hydrocarbon distillates and the like, and for various uses where wetting agents of the conventional type are employed. As to some of such uses which are well known, see "The Expanding Application of Wetting Agents," Chemical Industries, volume 48, page 324 (1941).

Having thus described our invention, what we claim as new and desire to secure by Letters Patent is:

1. Water-soluble surface-active sulphosuccinates within the molecular weight range of 536 to approximately 5,000 and of the formula

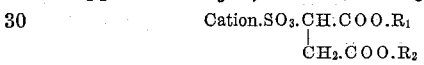

in which $R_1$ and $R_2$ are radicals of the alcohols $R_1OH$ and $R_2OH$, respectively; $R_1$ and $R_2$ being selected from the class consisting of ether alcohol radicals, monohydric alcohol radicals, polyhydric alcohol radicals, hydroxyacid radicals, radicals of hydroxylated fractional esters of polyhydric alcohols in which the acid radical is that of a higher fatty acid, and radicals of:

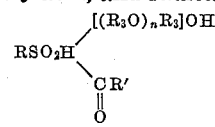

in which R is a member of the class consisting of aryl radicals having less than 3 rings and alkylaryl radicals having less than 3 rings, and in which the alkyl side chain has less than 21 carbon atoms; $R'CO$ is the acidyl radical of a high molal detergent-forming monocarboxy acid having at least 8 and not more than 32 carbon atoms; $R_3O$ is an alkyleneoxy radical having less than 5 carbon atoms of a compound selected from the class consisting of ethylene oxide, propylene oxide, butylene oxide, glycidol and methyl glycidol and equivalent to the ruptured ring of the formula

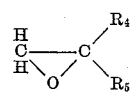

in which $R_4$ and $R_5$ are selected from the class consisting of hydrogen atoms, methyl radicals and methylol radicals; and $n$ is a numeral varying from 0 to 59, with the proviso that at least one of the two radicals $R_1$ and $R_2$ be the radical of the aforementioned alcohol

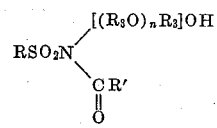

2. The sulphosuccinate described in claim 1, wherein R'CO is the acidyl radical of a higher fatty acid.

3. The sulphosuccinate described in claim 1, wherein R'CO is the acidyl radical of an unsaturated higher fatty acid.

4. The sulphosuccinate described in claim 1, wherein R'CO is the acidyl radical of an unsaturated higher fatty acid and R is a monocyclic aromatic radical.

5. The sulphosuccinate described in claim 1, wherein R'CO is the acidyl radical of an unsaturated higher fatty acid and R is a monocyclic aromatic radical having a side chain of less than 6 carbon atoms.

6. The sulphosuccinate described in claim 1, wherein R'CO is the acidyl radical of an unsaturated higher fatty acid and R is a monocyclic aromatic radical having a side chain of less than 6 carbon atoms, and the radical $R_3$ is the ethylene radical.

7. The sulphosuccinate described in claim 1, wherein R'CO is the acidyl radical of an unsaturated higher fatty acid and R is a monocycle aromatic radical having a side chain of less than 6 carbon atoms, the radical $R_3$ is a propylene radical.

8. The sulphosuccinate described in claim 1, wherein R'CO is the acidyl radical of an unsaturated higher fatty acid and R is a monocyclic aromatic radical having a side chain of less than 6 carbon atoms, the radical $R_3$ is a butylene radical.

9. In the manufacture of the sulphosuccinate described in claim 1, the steps of (A) oxyalkylating an acidyl-aryl-sulphonimide of the formula

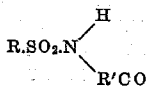

wherein R is a member of the class consisting of aryl radicals having less than 3 rings and alkyl-aryl radicals having less than 3 rings, and in which the alkyl side chain has less than 21 carbon atoms, R'CO is an acidyl radical obtained from a high molal detergent-forming monocarboxy acid having at least 8 carbon atoms and not more than 32 carbon atoms, so as to obtain a compound of the formula

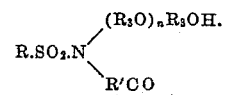

wherein $R_3O$ is an alkyleneoxy radical having less than 5 carbon atoms of a compound selected from the group consisting of ethylene oxide, propylene oxide, butylene oxide, glycidol and methyl glycidol radicals equivalent to the ruptured ring of the formula

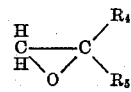

in which $R_4$ and $R_5$ are selected from the class consisting of hydrogen atoms, methyl radicals and methylol radicals; and $n$ is a numeral varying from 0 to 59; followed by the step of (B) esterifying said aforementioned oxyalkylated compound with a member of the class consisting of maleic acid and maleic acid esters, and followed by the step of (C) sulphonating said maleic acid ester by reaction with a bisulphite of the formula Cation .$H.SO_3$

MELVIN DE GROOTE.
BERNHARD KEISER.